Sept. 1, 1925.
H. F. JAMES ET AL
1,551,884
DISH WASHING AND DRYING MACHINE
Filed Feb. 25, 1922   2 Sheets-Sheet 1
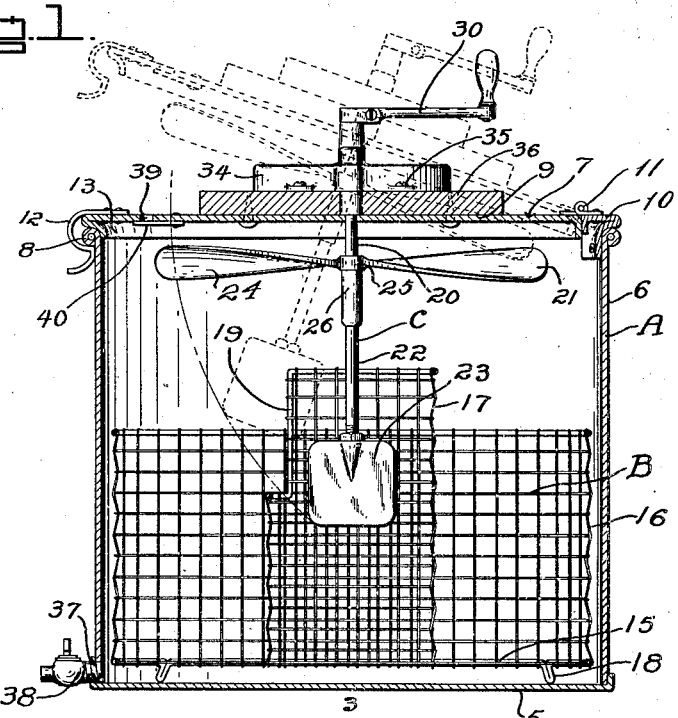
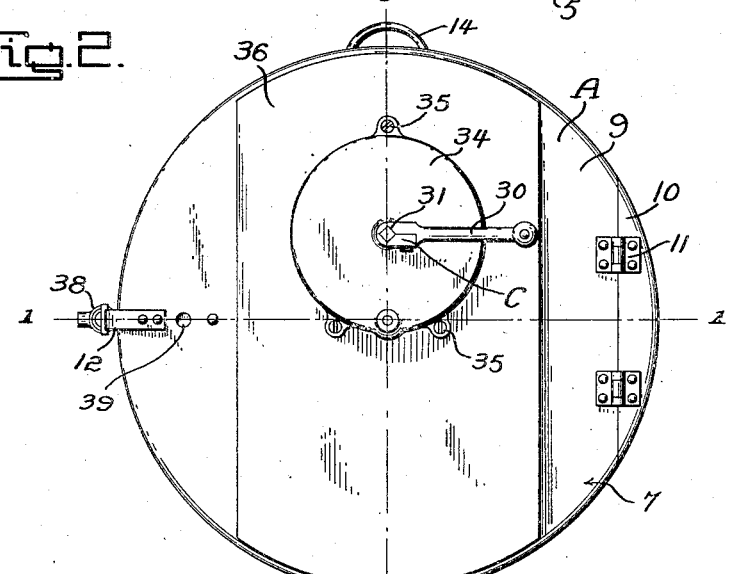
Inventors
Herbert F. James
Charles E. James
By Lancaster and Allwine
Attorneys Sept. 1, 1925.
H. F. JAMES ET AL
1,551,884
DISH WASHING AND DRYING MACHINE
Filed Feb. 25, 1922
2 Sheets-Sheet 2
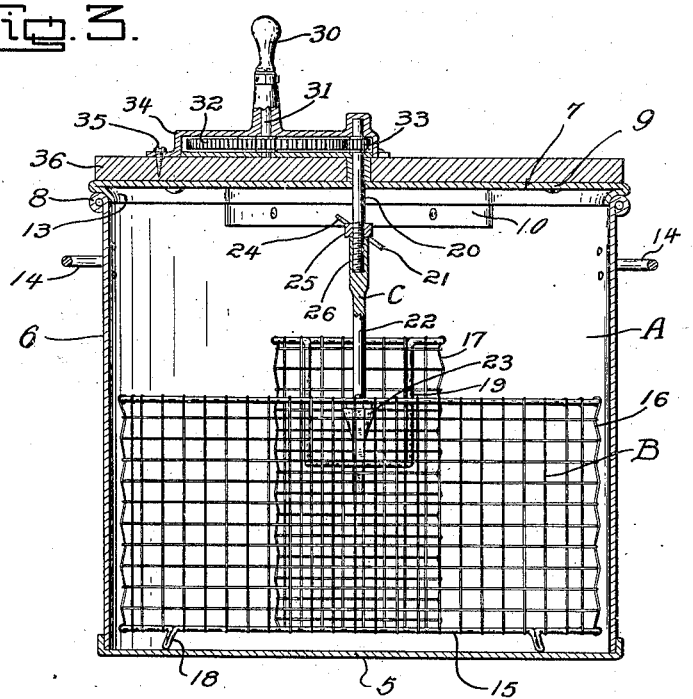
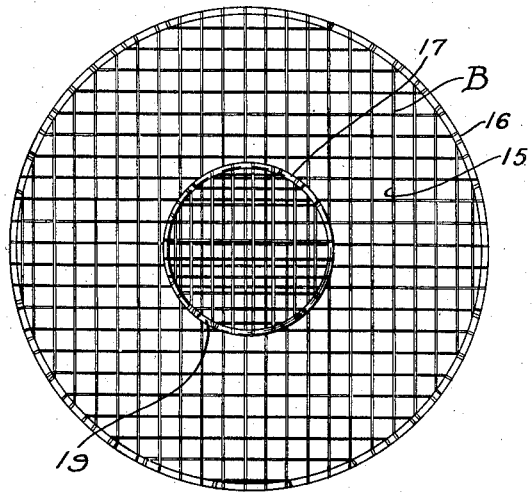
Inventors
Herbert F. James
Charles E. James Patented Sept. 1, 1925.

1,551,884

UNITED STATES PATENT OFFICE.

HERBERT F. JAMES AND CHARLES E. JAMES, OF GREENVILLE, PENNSYLVANIA.

DISH WASHING AND DRYING MACHINE.

Application filed February 25, 1922. Serial No. 539,244.

*To all whom it may concern:*

Be it known that we, HERBERT F. JAMES and CHARLES E. JAMES, citizens of the United States, residing at Greenville, in the county of Mercer and State of Pennsylvania, have invented certain new and useful Improvements in Dish Washing and Drying Machines, of which the following is a specification.

This invention relates to washing machines and the primary object of the invention is to provide a dish washing machine of simple character, which is so constructed that the dishes can be both washed and dried therein.

Another object of the invention is the provision of a dish washing machine embodying a casing, a novel fabricated basket for receiving the dishes, novel means for circulating water around the dishes to cleanse the same, and novel means for directing air currents around the dishes after the water has been drained from the casing to permit the drying of the dishes.

A further object of the invention is the provision of an operating shaft embodying a water circulating member, and an air circulating member, the shaft being driven by a single driving member, and so disposed that the said water and air circulating members will cause the water and air to act upon the dishes in an efficient manner to cause the thorough cleaning and drying thereof.

A further object of the invention is the provision of novel means for forming the dish receiving basket, so that the dishes will be protected and spaced from the water propeller, the basket permitting the free circulation of water and air therethrough.

A still further object of the invention is to provide a dish washing and drying machine, which will be durable and efficient in use, one that will be simple and easy to manufacture, and one which can be placed upon the market at a reasonable cost, so that the same can be used for household purposes.

With these and other objects in view, the invention consists in the novel construction, arrangement and formation of parts, as will be hereinafter more specifically described, claimed and illustrated in the accompanying drawing, forming a part of this specification, in which drawings:

Figure 1 is a vertical diametric section through the improved machine, taken on the line 1—1 of Figure 2.

Figure 2 is a top plan view of the improved dish washing and drying machine.

Figure 3 is a vertical diametric section taken at right angles to Figure 1 on the line 3—3 of Figure 2.

Figure 4 is a top plan view of the improved dish washing basket.

Referring to the drawings in detail, wherein similar reference characters designate corresponding parts throughout the several views, the letter A indicates the casing of the improved machine; B, the basket for receiving the dishes to be washed and dried; and C, the dish washing and drying means.

The casing A can be of any desired size, according to whether the same is to be used for household purposes or for lunch room purposes or the like and can be formed of any desired material, such as sheet metal. As shown, the casing A includes the circular bottom wall 5, the cylindrical side wall 6, and the disc or circular shaped top wall 7. The bottom wall 5 can be secured to the cylindrical side wall 6 in any preferred manner, and the upper edge of the side wall 6 is preferably rolled to provide a bead 8.

The top wall 7 includes a movable section 9, and a rigid section 10, which can be secured in any preferred manner to the side wall 6, such as by rivets or the like. It can be seen that the rigid section 10 forms a very small part of the top wall 7 and merely constitutes means for permitting the hinging of the movable section 9 of the top wall in place, and it can be seen that ordinary type of hinges 11 are utilized for connecting the movable portion 9 with the rigid portion 10. If it is desired, the front edge of the movable portion 9 may be provided with a resilient latch 12, which is adapted to engage the bead 8. It is also preferred that the outer edge of the movable section 9 of the top wall 7 be provided with a downwardly and inwardly extending flange 13, which snugly engages the bead 8. The opposite sides of the cylindrical side walls 6 may be provided with handles 14, so as to permit the convenient handling of the machine. Owing to the construction of the top wall 7, it can be seen that when the hinged portion 9 thereof is swung to its operative position that displacement of water out of the casings will be absolutely precluded, due to the formation of the flange carried by the top wall which engages the head 8.

The dish receiving basket B is of such a size as to readily fit within the casing A, and is preferably formed of woven wire so as to permit the free circulation of water and air therethrough. This basket, as shown, includes the circular or disc shaped bottom wall 15, the cylindrical side wall 16 and the axial cylinder 17. The cylinder 17 is also formed of woven wire, and extends above the upper edge of the side wall 16 of the basket. It is preferred to provide depending legs or feet 18 on the basket so as to space the lower wall 15 of the basket from the lower wall 5 of the casing. The dishes to be washed and dried, are placed in the basket intermediate the cylinder 17 and the cylindrical side wall 16, and the water circulating means is adapted to fit directly in the cylinder, and thus this cylinder prevents the water circulating means from coming into direct contact with the dishes. One side of the cylinder 17 adjacent to its upper end may be provided with a cut out portion 19, which permits the convenient placing of the water circulating means within the cylinder 17 of the basket B.

The water and air circulating means C comprises an operating shaft 20 to which can be detachably secured the air circulating propeller 21, and the shank 22 of the water circulating propeller 23. The operating shaft 20 is disposed at the axial center of the casing, and the extreme lower end thereof is provided with male threads. The air circulating propeller 21 is of any approved type used for circulating air and consists of the blades 24 and the hub 25. The hub 25 is provided with internal threads for receiving the lower threaded end of the operating shaft 20. The upper end of the shank 22 of the water circulating propeller 23 is provided with an internally threaded socket 26 for receiving the lower end of the operating shaft 20, and it is obvious that this socket 26 will hold the air circulating propeller in place against displacement, but if so desired, a suitable set screw or the like can be carried by the hub of the air circulating propeller 21 for impinging against the operating shaft.

The water circulating propeller 23 may also be detachably associated with the shank 22 if so desired, and this propeller has its blades formed relatively wide. The propeller 23 is adapted to fit directly in the cylinder 17 and is of such a shape as to agitate the water and force the same around the dishes which may be placed in the basket. The shaft 20 is carried by a suitable bearing secured to the axial center of the hinged portion 9 of the cover 7 and when the hinged portion is swung open, the propeller 23 is permitted to ride out of the cylinder 17 through the cut-out portion 19 thereof. The shaft 20 may be driven in any preferred manner, and as shown by way of example in the drawing, the same is driven by hand crank 30.

The crank 30 can be secured to the operating shaft 31, to which can be secured a relatively large gear wheel 32, which is adapted to mesh with a relatively small pinion 33 which can be keyed to the axial operating shaft 20. The gears 32 and 33 are adapted to be enclosed in a housing 34 which may be secured by suitable fastening elements 35 to a base plate 36 which can be secured to the top wall 7 as clearly shown in Figures 1, 2, and 3 of the drawings.

The extreme lower end of the side wall 6 is provided with a nipple 37 to which may be secured a pet cock 38, by means of which the water may be drained from the casing. This pet cock also forms means for permitting the exit of air from the casing as will be hereinafter more fully described. The top wall 7 can be provided with an air inlet opening 39, which can be normally closed by a suitable flap 40, if so desired.

In operation of the improved dish washing machine, the hinged portion 9 of the top wall 7 is thrown back and the dishes to be washed are placed within the basket B, intermediate the side walls 16 and the cylinder 17. The pet cock is turned so as to prevent the exit of water therethrough and hot water is then poured over the dishes and into the casing until the same are completely immersed. A suitable detergent such as soap powder may be then sprinkled in the water and the hinged portion 9 of the cover is drawn to its closed position. The propeller 23 will, of course, be immersed in the water, and it is merely necessary to turn the crank 30 which will cause the agitation and the forcible circulation of the water past the dishes which will effectively cleanse the same.

After the dishes have been cleaned, it is merely necessary to open the pet cock 38 and allow the water to drain therefrom. This pet cock will then be left open and the flap 40 will be moved so as to open the air entrance opening 39. The crank 30 is then again rotated, and the propeller 21 will draw in air through the opening 39 and circulate the same around and past the dishes and the air is permitted to escape through the pet cock. The circulation of air past the dishes will, of course, effectively dry the same, and after the dishes have become dried, the basket can be completely removed or the dishes simply lifted out from the same.

After the dishes have been washed and the dirty water drained from the casing and prior to the drying operation, it is essential that clean hot water be poured over the dishes in order to permit the rinsing thereof.

From the foregoing description, it can be seen that an extremely simple dish washing machine of durable construction has been provided, in which the dishes can be effectively washed and cleaned without removing the same from the dish basket.

Changes in details may be made without departing from the spirit or scope of this invention; but we claim:

1. The combination with a dish washer including a casing, a cover for said casing, a dish receiving basket in said casing having a well with perforated walls, and a rotatable operating shaft extending from the cover downwardly into the well when the cover is closed and carrying a water agitator operating in the well when the shaft is rotated, of an air propeller rigidly mounted upon said shaft adjacent said cover and rotating with the shaft when the shaft is operated.

2. In a dish washing machine, a casing including a bottom wall, a side wall, and a hinged top wall, a dish receiving basket mounted in the casing including a bottom wall, an outer side wall, and a cylinder carried by the axial center of the bottom wall, an axially disposed operating shaft carried by the top wall, a water circulating propeller carried by the lower end of the shaft and adapted to be disposed in the cylinder, the cylinder having a cut-out portion therein to permit the free entrance and exit of the propeller into and out of the cylinder upon swinging movement of said hinged top wall, and means for actuating the shaft carried by the hinged top wall.

HERBERT F. JAMES.
CHARLES E. JAMES.